Dec. 21, 1926.

E. JOHNSON

PROPULSION MECHANISM

Filed Oct. 17, 1925

1,611,590

Inventor
Edgar Johnson

By Herbert E. Smith
Attorney

Patented Dec. 21, 1926.

1,611,590

UNITED STATES PATENT OFFICE.

EDGAR JOHNSON, OF DEEPCREEK, WASHINGTON.

PROPULSION MECHANISM.

Application filed October 17, 1925. Serial No. 63,037.

My present invention relates to improvements in propulsion mechanism which, while specially adapted for use in propelling vehicles as used by children, is also applicable for many other purposes. In the exemplified form of my invention a manually operated four wheel vehicle of the velocipede type is equipped with the propelling mechanism involving the employment of transmission gearing of the lever and crank class. By the utilization of the propelling mechanism constructed according to my invention a smooth running, efficient and simple structure is provided, and the labor required to be expended by the child in operating the vehicle is materially reduced.

The invention consists in certain novel combinations and arrangements of parts involving the transmission of power through the propelling mechanism as will be hereinafter more fully pointed out and claimed.

In the accompanying drawings I have illustrated one complete example of the physical embodiment of my invention using both a chain drive and gear drive in the transmission, wherein the parts are combined and arranged according to one mode I have thus far devised for the practical application of the principles of my invention.

Figure 1:
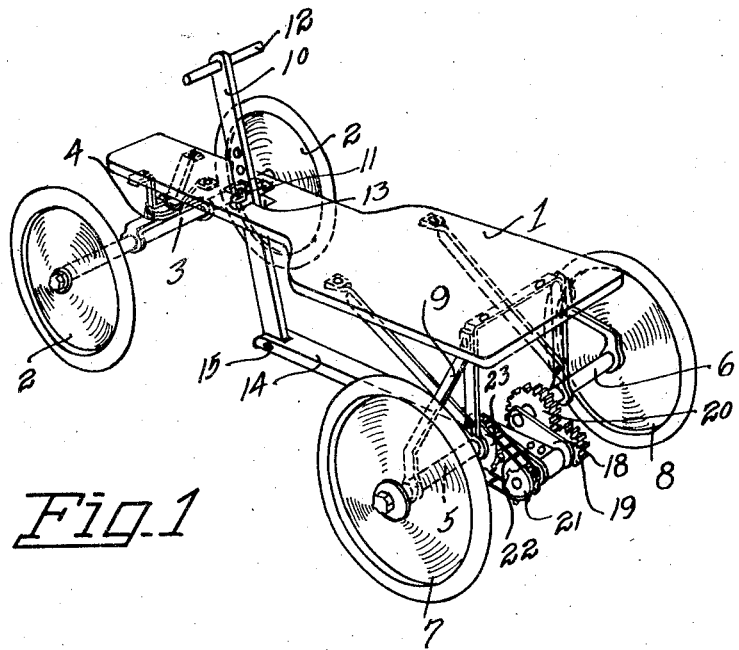
Figure 1 is a perspective view of a manually operated vehicle or velocipede of the four wheel type equipped with the propelling mechanism of my invention which utilizes a differential transmission.

In order that the utility, general arrangement and relation of parts may readily be understood I have illustrated in the drawings a child's four wheel velocipede which employs the usual seat board 1, front steering wheels 2 and axle 3, with the fifth wheel 4. Such a vehicle is preferably steered by pressure of the feet on the front axle, and is propelled by the manual operation of the propelling mechanism, the power being applied to the rear driving shaft or crank shaft, which includes two aligned sections 5 and 6 each having a driving wheel as 7 and 8 rigid therewith and to rotate therewith.

The aligned sections of the drive shaft are journaled to revolve in bearings of an arch frame 9 arranged transversely of the vehicle and rigidly fixed as by bolts or rivets at the underside of the seat board 1.

A manually operated lever 10 located in position for ready access by the driver seated on the seat board, is pivoted as usual at 11 and provided with a handle 12. The pivotal connection is located above the seat board and the lever operates or oscillates in a slot 13 extending longitudinally of the seat board.

Below the seat board is arranged a longitudinally extending pitman 14 pivoted at 15 to the lower end of the lever 10 and extending toward the rear of the vehicle. At its rear end the pitman has a wrist pin 16 journaled therein with a suitable bearing bushing or sleeve, and this pin is loose in the yoke and forms part of the rotary structure that includes crank arms 17 and 18 which are fully mounted on the inner adjoining ends of the shaft sections 5 and 6 respectively.

To insure a flexible arrangement in the transmission of power through the propelling mechanism from the operating lever, not only while the vehicle is moving straight forward, but while turning as well, I utilize a sprocket and chain drive at one side of the pitman for a shaft section and also a gear drive at the other side of the pitman for the remaining shaft section.

Figure 2:
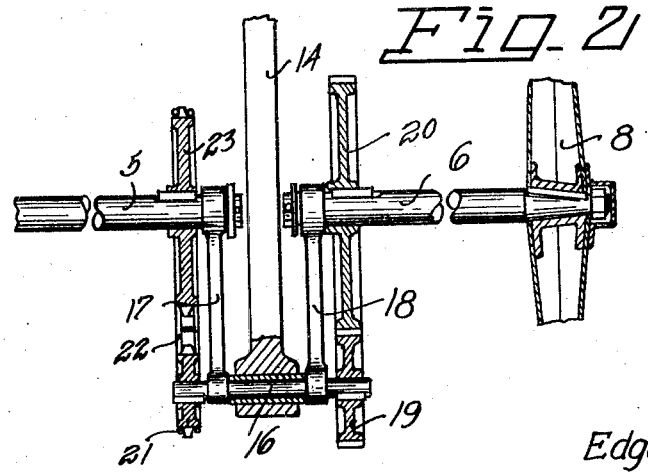
Figure 2 is a detail sectional view enlarged showing the crank shaft and differential transmission means.

As best seen in Figure 2 the wrist pin has extension ends beyond the crank arms of the yoke, and one of these ends has a pinion 19 keyed thereon which meshes with a larger gear wheel 20 keyed on the shaft section 6 for a direct transmission or drive. On the opposite side of the pitman a small sprocket wheel 21 is keyed on the end of the pin 16, and a chain 22 passes over this wheel and also over the larger sprocket wheel 23 on the shaft section 5.

From this description taken in connection with my drawings it will be apparent that the rotary crank shaft involving the two shaft sections and yoke will drive the vehicle forward with the transmission of power through the direct gears 19 and 20. When a turn is made in the direction of travel of the vehicle a differential action of the transmission is accomplished through the reversal of movement between the direct drive and the chain drive because of the difference in direction of travel between the gears and the sprocket drive.

Having thus fully described my invention, what I claim as new and desire to secure by Letters Patent is—

1. In a vehicle propulsion mechanism the combination with shaft sections and crank arms journaled thereon, of a wrist pin journaled in said arms and a pitman journaled on the pin, and transmission mechanism between the wrist pin and the respective shaft sections for permitting a differential action of the shaft.

2. In a vehicle propulsion mechanism the combination with shaft sections are crank arms journaled thereon, of a wrist pin journaled in said sections and a pitman journaled on said pin, said pin having extension ends, a pinion on one of said ends and a complementary gear on one of said sections, a sprocket wheel on the other pin-end, a sprocket wheel on the other shaft section, and a sprocket chain connecting said sprocket wheels.

3. In a self propelled vehicle the combination with drive-shaft sections having drive wheels thereon, spaced crank arms freely mounted on said sections and a wrist pin journaled in said arms, of a pitman journaled on said pin and a manually operated lever for said pitman, said pin having extension ends, a gear drive between one end and one section and a sprocket chain drive between the other end and shaft section.

In testimony whereof I affix my signature.

EDGAR JOHNSON.